US008554377B2

(12) United States Patent
Mathur et al.

(10) Patent No.: US 8,554,377 B2
(45) Date of Patent: Oct. 8, 2013

(54) THERMAL ENERGY STORAGE SYSTEM COMPRISING OPTIMAL THERMOCLINE MANAGEMENT

(75) Inventors: Anoop K Mathur, Shoreview, MN (US); Rajan B Kasetty, Riverside, CA (US)

(73) Assignee: Terrafore, Inc., Riverside, CA (US)

( * ) Notice: Subject to any disclaimer, the term of this patent is extended or adjusted under 35 U.S.C. 154(b) by 593 days.

(21) Appl. No.: 12/945,350

(22) Filed: Nov. 12, 2010

(65) Prior Publication Data
US 2012/0118554 A1 May 17, 2012

(51) Int. Cl.
G05D 7/00 (2006.01)
G05D 23/00 (2006.01)
G05B 13/02 (2006.01)
F28D 17/00 (2006.01)
F28D 19/00 (2006.01)
F28D 15/00 (2006.01)

(52) U.S. Cl.
USPC ............ 700/282; 700/28; 700/274; 700/299; 165/10; 165/82; 165/104.11; 165/293; 60/604; 60/730

(58) Field of Classification Search
USPC ............... 700/28, 274, 282, 299; 165/10, 82, 165/104.11, 104.21, 293; 60/604, 730
See application file for complete search history.

(56) References Cited

U.S. PATENT DOCUMENTS

| 4,249,695 | A   | * | 2/1981  | Dreibelbis ............... 236/12.2 |
|-----------|-----|---|---------|-------------------------------------|
| 4,941,475 | A   | * | 7/1990  | Williams et al. ............ 600/505 |
| 6,142,219 | A   | * | 11/2000 | Korenic et al. ............ 165/110 |
| 7,771,664 | B2  | * | 8/2010  | Ashe et al. ................ 422/109 |
| 7,832,217 | B1  | * | 11/2010 | Reich et al. ................... 62/59 |
| 2003/0213246 | A1 | * | 11/2003 | Coll et al. ................. 60/653 |
| 2004/0202586 | A1 | * | 10/2004 | Ashe et al. ................ 422/109 |
| 2005/0091021 | A1 | * | 4/2005  | Gupta et al. .................. 703/12 |
| 2005/0173003 | A1 | * | 8/2005  | Laverdiere et al. ....... 137/487.5 |
| 2010/0230075 | A1 | * | 9/2010  | Mathur et al. .......... 165/104.21 |
| 2012/0018116 | A1 | * | 1/2012  | Mathur et al. ............... 165/10 |

* cited by examiner

*Primary Examiner* — Ramesh Patel
(74) *Attorney, Agent, or Firm* — ShRaVi, LLC

(57) ABSTRACT

Methods for optimizing a thermocline in a thermal energy storage fluid within a thermal energy storage tank are disclosed. The methods comprise identifying a thermocline region in the fluid, adding thermal energy to a fluid stream extracted from the thermocline region, and returning the fluid stream to the tank at a plurality of locations above the thermocline region. The methods further comprise regulating the temperature of the fluid returned to the tank at a set point temperature by modulating the flow rate of the fluid stream and by changing the location from where the fluid is extracted from the tank.

56 Claims, 9 Drawing Sheets

THERMAL ENERGY STORAGE SYSTEM COMPRISING OPTIMAL THERMOCLINE MANAGEMENT

TECHNICAL FIELD

The present invention relates to a thermal energy storage system. More specifically, the invention relates to maintaining and optimizing a thermocline in a thermal energy storage fluid contained within a thermal energy storage tank.

BACKGROUND

A thermal energy storage system comprises a thermal energy storage fluid contained within a tank. In operation, thermal energy is stored within the fluid by extracting the fluid from the tank, pumping the extracted fluid through a heat exchanger wherein thermal energy in the form of heat is added to the fluid thereby raising its temperature, and returning the heated fluid to the thermal energy storage tank. As is well known in the art, the density of a fluid decreases as the temperature of the fluid increases. As such, a fluid at a relatively lower temperature will have a density which is relatively higher than the density of the same fluid at a relatively higher temperature. Accordingly, the density of the heated fluid returned to the tank will be relatively lower than the density of the fluid extracted from the tank. Therefore, the relative higher temperature and relatively less dense fluid will stay above the relatively lower temperature and relatively more dense fluid. As can be seen, the fluid at the highest temperature will stay near the top of the thermal storage tank while the fluid at the lowest temperature will stay towards the bottom of the tank. This separation of the relatively warmer and relatively less dense fluid from the relatively cooler and relatively more dense fluid is known as thermal stratification or thermocline. In a perfectly stratified thermal storage tank, only the fluid at the highest temperature will be at the top of the tank, and only the fluid at the coldest temperature will be at the bottom of the tank. However, in a typical thermal storage tank, there exists a transition layer between the hot and cold regions.

One shortcoming of thermal energy storage systems is that it is relatively difficult to maintain a thermocline in a fluid within a thermal storage tank. The process of repeatedly extracting the fluid at a relatively cooler temperature from near the bottom of the tank and returning the fluid at a relatively higher temperature to near the top of the tank increases the width of the transition layer resulting in a degradation of the thermocline in the fluid within the thermal storage tank. The ratio of the difference between the height of the fluid in the tank and the width of the transition layer to the total height of the fluid in the tank is known in the art as the utilization factor. The utilization factor provides an indication of the amount of useful thermal energy stored in the tank. Accordingly, as the width of the transition layer increases, the utilization factor, and therefore the thermal storage capacity, decreases.

As is well known in the art, the thermocline in a thermal storage tank degrades due to a number of factors such as conduction between the layers of fluid at different temperatures, mixing of the fluid due to turbulence, an increase in the velocity of the fluid, etc. Additionally, thermocline degradation becomes more severe where there is an insufficient amount of thermal energy available. The repeated process of partially charging the tank, i.e., adding thermal energy to the tank, and not completely discharging the tank, i.e., removing thermal energy from the tank, further degrades the thermocline in a thermal storage tank. One approach for minimizing thermocline degradation and improving the utilization factor is to periodically discharge the tank completely to eliminate the thermocline and then re-establish a thermocline by fully charging the tank. However, this approach is inefficient, cumbersome, and not operationally practical.

In order to more efficiently store thermal energy in a fluid contained within a thermal energy storage tank, it is desirable to maintain a region of relatively warmer fluid separate from and above a region of relatively cooler fluid. As such, it is desirable to maximize the utilization factor by minimizing the width of the thermocline region.

Accordingly, it is an objective of the present invention to provide a thermal energy storage tank for optimally managing a thermocline in a thermal energy storage fluid contained within the thermal energy storage tank.

SUMMARY

An embodiment of the invention comprises a method for optimally managing a thermocline in a thermal energy storage fluid contained within a thermal energy storage tank. Temperatures of the fluid within the tank are measured at a plurality of locations along the vertical height of the tank, and are used for identifying the thermocline region within the fluid and for computing the average temperature of the fluid in the thermocline region. Fluid is extracted from the tank at a location whereat the temperature of the fluid within the tank equals the computed average temperature of the fluid in the thermocline region. The extracted fluid is pumped through a heat exchanger wherein thermal energy is added to the fluid to increase its temperature, and the heated fluid is returned to the tank at a location above the thermocline region. The temperature of the fluid exiting the heat exchanger and returned to the tank is maintained at a set point temperature by modulating the flow rate of the fluid extracted from the tank and pumped through the heat exchanger.

A thermal energy storage tank in an embodiment of the invention comprises a thermal energy storage fluid contained within the tank and a plurality of temperature sensors for measuring the temperatures of the fluid at a plurality of locations along the vertical height of the tank. The tank further comprises a plurality of valves at a plurality of locations along the vertical height of the tank for extracting the fluid from the thermocline region. An inlet of each one of the plurality of valves is in fluid communication with the fluid within the tank and an outlet of each one of the plurality of valves is in fluid communication with a header. A pump in fluid communication with the header extracts fluid from the tank and pumps the extracted fluid through a heat exchanger. In the heat exchanger, thermal energy is added to the extracted fluid pumped through the heat exchanger and the heated fluid is returned to the tank at a location above the thermocline region. The operation of the pump and the operation of each one of the plurality of valves is controlled by a controller in accordance with an embodiment of the method of the invention.

DETAILED DESCRIPTION

While multiple embodiments of the instant invention are disclosed, still other embodiments may become apparent to those skilled in the art. The following detailed description describes only illustrative embodiments of the invention. It should be clearly understood that there is no intent, implied or otherwise, to limit the invention in any form or manner to that described herein. As such, all alternative embodiments of the invention are considered as falling within the spirit, scope and intent of the disclosure.

Figure 1:
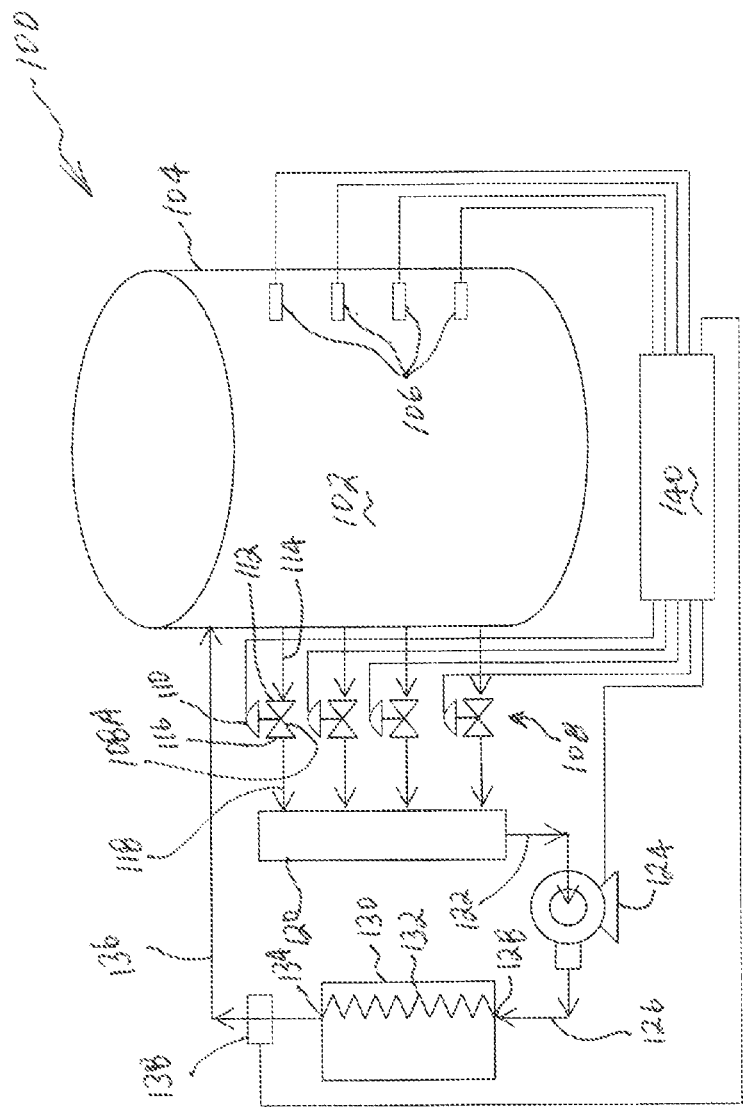
FIG. 1 is an illustration of a thermal energy storage system in accordance with an embodiment of the invention.

FIG. 1 is an illustration of thermal energy storage system 100 in accordance with an embodiment of the invention. Thermal energy storage system 100 comprises thermal energy storage fluid 102 contained within thermal energy storage tank 104.

In an embodiment of the invention, thermal energy storage fluid 102 is a single phase fluid in the form of a liquid which does not undergo a change in phase. In an alternate embodiment of the invention, thermal energy storage fluid 102 is a phase change fluid which undergoes a change in phase between the liquid and solid phases. In another embodiment of the invention, fluid 102 is a slurry comprising both liquid and solid phases. In yet another embodiment, tank 104 contains a solid such as rocks or pebbles submerged in fluid 102 wherein fluid 102 is a liquid such as oil or fluid 102 is a phase change fluid which undergoes a change in phase between the liquid and solid phases. In an alternate embodiment, tank 104 contains an encapsulated phase change material submerged in fluid 102 wherein fluid 102 is a liquid such as oil or fluid 102 is a phase change fluid which undergoes a change in phase between the liquid and solid phases.

Tank 104 includes a plurality of temperature sensors 106 at a plurality of locations along a vertical height of the tank. While four temperature sensors 106 are shown in FIG. 1, it should be understood that there is no intent to restrict the total number of temperature sensors 106 to four. Temperature sensors 106 are used for measuring the temperature of fluid 102 within tank 104 and therefore for identifying a thermocline region in fluid 102. Accordingly, in alternate embodiments of the invention the total number of temperature sensors 106 can be less than four or more than four. In the embodiment of the invention illustrated in FIG. 1, temperature sensors 106 are located inside tank 104 and submerged in fluid 102. In an alternate embodiment, temperature sensors 106 are within a plurality of thermowells extending into fluid 102 through a surface of tank 104. In another embodiment, temperature sensors 106 are in contact with an inside surface of tank 104. In yet another embodiment, temperature sensors 106 are in contact with an outside surface of tank 104.

Tank 104 further includes a plurality of valves 108. While four valves 108 are shown in FIG. 1, it should be understood that there is no intent to restrict the total number of valves 108 to four. In alternate embodiments the total number of valves 108 can be less than four or more than four. Valves 108 are used for extracting fluid 102 from a plurality of locations along the vertical height of tank 104. Each one of the plurality of valves 108, for example valve 108A in FIG. 1, includes valve actuator 110 for operating valve 108A to an open position, to a closed position, or to any position between the open and closed positions. Each one of the plurality of valves 108, again for example valve 108A in FIG. 1, comprises inlet 112 with flow path 114 providing fluidic communication with fluid 102 at a plurality of locations along the vertical height of tank 104. Each one of the plurality of valves 108, again for example valve 108A, further comprises outlet 116 with flow path 118 providing fluidic communication with header 120.

Flow path 122 provides fluidic communication between header 120 and an inlet of pump 124. Flow path 126 provides fluidic communication between an outlet of pump 124 and inlet 128 of heat exchanger 130. In an embodiment of the invention, pump 124 is a variable speed pump for modulating the flow rate of the pumped fluid between a minimum flow rate and a maximum flow rate. As such, pump 124 can be operated to maintain a minimum flow rate or to maintain a maximum flow rate or to modulate the flow rate between the minimum and maximum flow rates. In another embodiment, pump 124 is a constant speed pump providing a fixed flow rate.

Flow path 132 within heat exchanger 130 provides fluidic communication between inlet 128 and outlet 134 of heat exchanger 130. Flow path 136 provides fluidic communication between outlet 134 of heat exchanger 130 and fluid 102 within tank 104. Sensor 138 measures the temperature of the fluid returned to tank 104 along flow path 136. In an embodiment of the invention, sensor 138 measures the temperature of the fluid at outlet 134 of heat exchanger 130.

Thermal energy storage system 100 further comprises controller 140 for maintaining an optimal thermocline in fluid 102. Signals from sensor 138 and from the plurality of temperature sensors 106 are transmitted to controller 140 and, in accordance with an embodiment of the invention as described herein below, controller 140 transmits command signals to pump 124 and to each valve actuator on each of the plurality of valves 108, for example valve actuator 110 on valve 108A.

Figure 2:
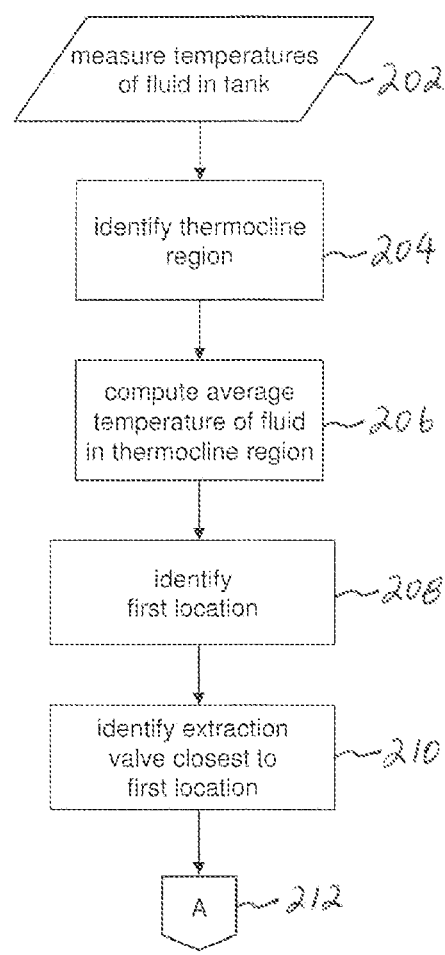
FIG. 2 is a flowchart of a method for identifying an extraction location for the fluid from the tank in accordance with an embodiment of the invention.

FIG. 2 is a flowchart of a method for identifying an extraction location for fluid 102 within tank 104 in accordance with an embodiment of the invention. In block 202, the plurality of temperature sensors 106 are used for measuring the temperatures of fluid 102 within tank 104 at a plurality of locations along the vertical height of tank 104. In block 204, the measured temperatures from block 202 are used to identify the thermocline region in fluid 102 within tank 104. The temperatures of fluid 102 within the thermocline region are used in block 206 to compute the average temperature of fluid 102 within the thermocline region. In block 208, the first location along the vertical height of tank 104 is identified as the location whereat the temperature of fluid 102 within tank 104 equals the computed average temperature of fluid 102 in the thermocline region as computed in block 206. From the plurality of valves 108, block 210 identifies the extraction valve as the valve closest in proximity to the first location as identified in block 208. At connecter 212 the method for optimizing the thermocline in fluid 102 within tank 104 continues as described herein below with reference to FIG. 3.

Figure 3:
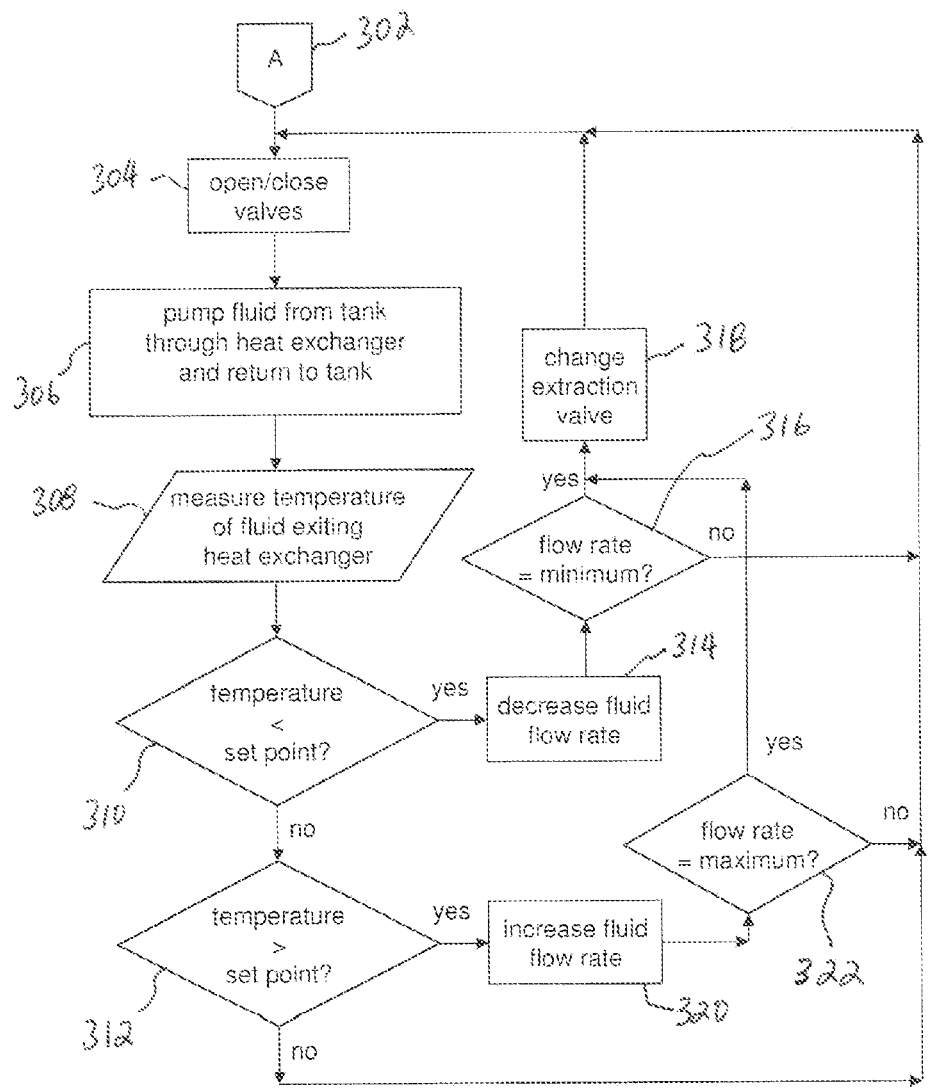
FIG. 3 is a flowchart of a method, in accordance with an embodiment of the invention, for regulating the fluid exiting the heat exchanger at a set point temperature.

FIG. 3 is a continuing flowchart of the method for optimizing the thermocline in fluid 102 within tank 104 in accordance with an embodiment of the invention. At connector 302, the method continues as follows. At block 304 the extraction valve is opened and all other valves are closed. At block 306, fluid 102 from tank 104 is extracted through the extraction valve and the extracted fluid is pumped through heat exchanger 130 and returned to tank 104 at one or more locations above the thermocline region. The temperature of the fluid exiting heat exchanger 130 is measured at block 308 and compared with the exit set point temperature in decision blocks 310 and 312.

At decision block 310, if the temperature of the fluid exiting heat exchanger 130 is less than the exit set point temperature, then the fluid flow rate is decreased at block 314 and in decision block 316 the decreased flow rate is compared to the pre-specified minimum flow rate. If the flow rate has decreased to the minimum value, then at block 318 the extraction valve for fluid 102 is changed to a different extraction valve along the vertical height of tank 104 and the method repeats at block 304. If the flow rate has not decreased to the minimum value, then the extraction valve is not changed and the method repeats at block 304.

At decision block 310, if the temperature of the fluid exiting heat exchanger 130 is not less than the exit set point temperature, then decision block 312 checks whether the temperature of the fluid exiting heat exchanger 130 is greater than the exit set point temperature. At decision block 312, if the temperature of the fluid exiting heat exchanger 130 is greater than the exit set point temperature, then the fluid flow rate is increased at block 320 and in decision block 322 the increased flow rate is compared to the pre-specified maximum flow rate value. If the flow rate has increased to the maximum value, then at block 318 the extraction valve for fluid 102 is changed to a different extraction valve along the vertical height of tank 104 and the method repeats at block 304. If the flow rate has not increased to the maximum value, then the extraction valve is not changed and the method repeats at block 304.

Figure 4:
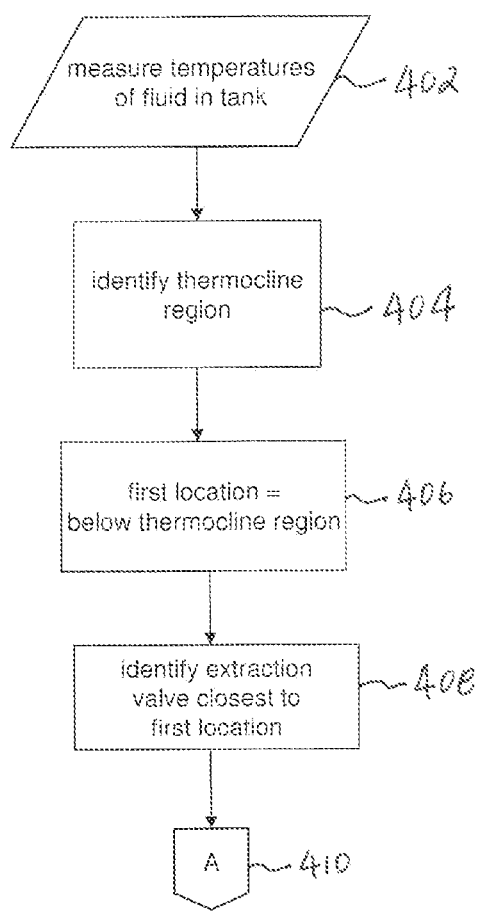
FIG. 4 is a flowchart of a method for setting an extraction location for the fluid from the tank in accordance with another embodiment of the invention.

FIG. 4 is a flowchart for another embodiment of a method for identifying an extraction location for fluid 102 within tank 104. In block 402, the plurality of temperature sensors 106 are used for measuring the temperatures of fluid 102 within tank 104 at a plurality of locations along the vertical height of tank 104. In block 404, the measured temperatures from block 402 are used to identify the thermocline region in fluid 102 within tank 104. In block 406, the first location along the vertical height of tank 104 is identified as the location below the thermocline region. From the plurality of valves 108, block 408 identifies the extraction valve as the valve closest in proximity to the first location as identified in block 406. At connecter 410 the method for optimizing the thermocline in fluid 102 within tank 104 continues as described herein above with reference to FIG. 3.

Figure 5:
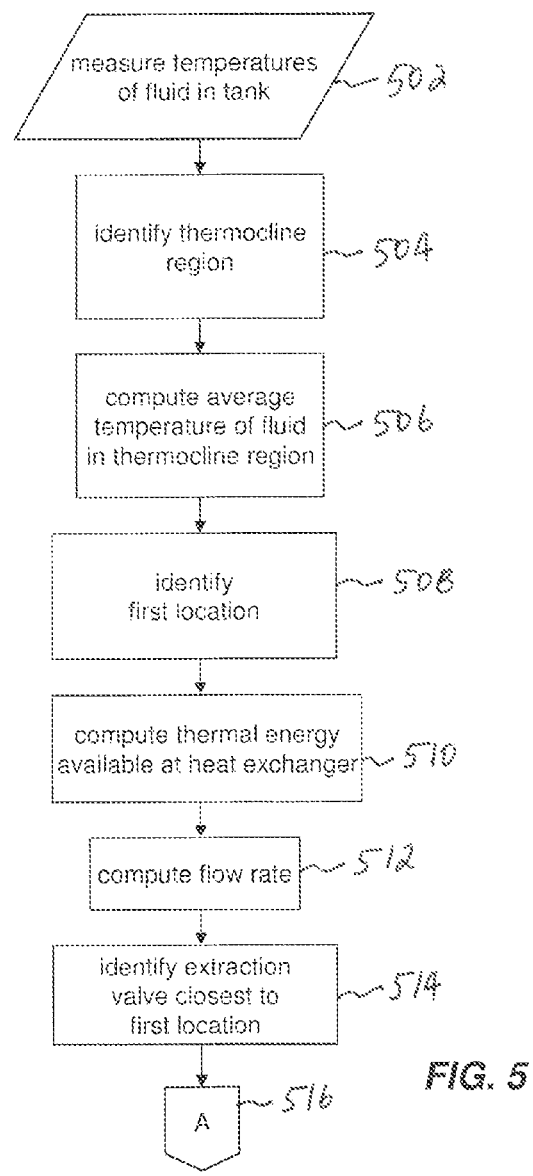
FIG. 5 is a flowchart of a method for identifying an extraction location for the fluid from the tank and computing the fluid flow rate in accordance with yet another embodiment of the invention.

FIG. 5 is a flowchart for yet another embodiment of a method for identifying an extraction location for fluid 102 within tank 104 and for computing the flow rate for the extracted fluid. In block 502, the plurality of temperature sensors 106 are used for measuring the temperatures of fluid 102 within tank 104 at a plurality of locations along the vertical height of tank 104. In block 504, the measured temperatures from block 502 are used to identify the thermocline region in fluid 102 within tank 104. The temperatures of fluid 102 within the thermocline region are used in block 506 to compute the average temperature of fluid 102 within the thermocline region. In block 508, the first location along the vertical height of tank 104 is identified as the location whereat the temperature of fluid 102 within tank 104 equals the computed average temperature of fluid 102 in the thermocline region as computed in block 506. Block 510 computes the amount of thermal energy available at heat exchanger 130 for transfer to the fluid flowing through heat exchanger 130. As will be more apparent from the description herein below in reference to FIGS. 8 and 9, the thermal energy available at heat exchanger 130 can be computed and/or measured in alternate embodiments of the invention. Alternatively, any one or more energy source can be configured to provide the thermal energy for transfer to the fluid flowing through heat exchanger 130, and the amount of thermal energy available at heat exchanger 130 can be computed and determined by means well known in the art.

The flow rate for the fluid flowing through heat exchanger 130 is computed at block 512 as a function of the amount of thermal energy available at heat exchanger 130 as computed at block 510, the average temperature of fluid 102 within the thermocline region as computed at block 506, and the exit set point temperature for the fluid exiting heat exchanger 130. From the plurality of valves 108, block 514 identifies the extraction valve as the valve closest in proximity to the first location as identified in block 508. At connecter 516 the method for optimizing the thermocline in fluid 102 within tank 104 continues as described herein above with reference to FIG. 3.

Figure 6:
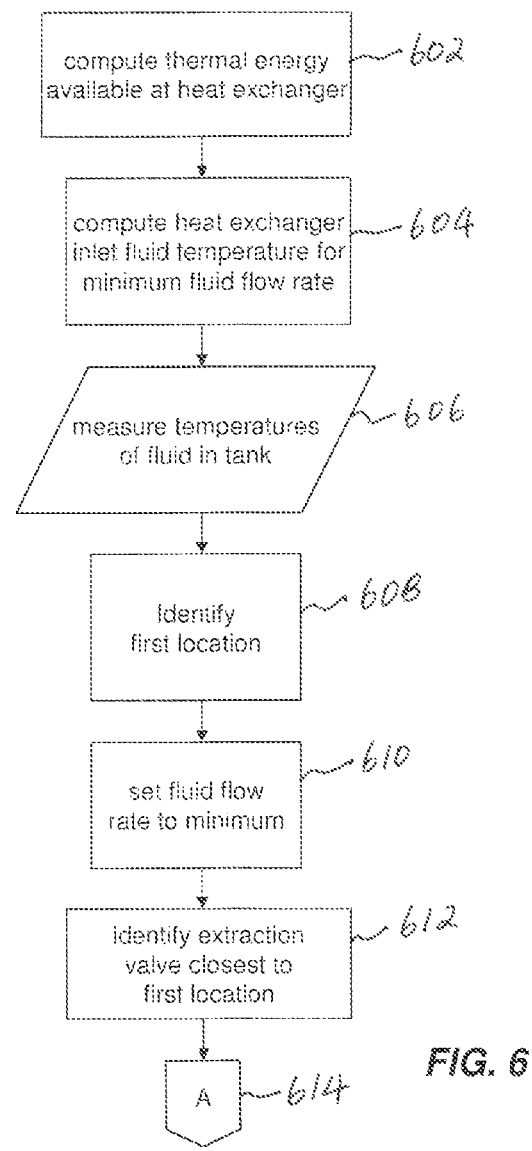
FIG. 6 is a flowchart of a method for identifying an extraction location for the fluid from the tank at the minimum flow rate in accordance with another embodiment of the invention.

FIG. 6 is a flowchart for another embodiment of a method for identifying an extraction location for fluid 102 within tank 104 at the minimum flow rate for the extracted fluid. Block 602 computes the amount of thermal energy available at heat exchanger 130 for transfer to the fluid flowing through heat exchanger 130. As will be more apparent from the description herein below in reference to FIGS. 8 and 9, the thermal energy available at heat exchanger 130 can be computed and/or measured in alternate embodiments of the invention. Alternatively, any one or more energy source can be configured to provide the thermal energy for transfer to the fluid flowing through heat exchanger 130, and the amount of thermal energy available at heat exchanger 130 can be computed and determined by means well known in the art. The inlet temperature for the fluid entering heat exchanger 130 is computed at block 604 as a function of the amount of thermal energy available at heat exchanger 130 as computed at block 602, the pre-specified minimum flow rate for the fluid flowing through heat exchanger 130, and the exit set point temperature for the fluid exiting heat exchanger 130. In block 606, the plurality of temperature sensors 106 are used for measuring the temperatures of fluid 102 within tank 104 at a plurality of locations along the vertical height of tank 104. In block 608, the first location along the vertical height of tank 104 is identified as the location whereat the temperature of fluid 102 within tank 104 equals the inlet temperature for the fluid entering heat exchanger 130 as computed at block 604. Block 610 sets the flow rate for the fluid flowing through heat exchanger 130 to the pre-specified minimum flow rate value. From the plurality of valves 108, block 612 identifies the extraction valve as the valve closest in proximity to the first location as identified in block 608. At connecter 614 the method for optimizing the thermocline in fluid 102 within tank 104 continues as described herein above with reference to FIG. 3.

Figure 7:
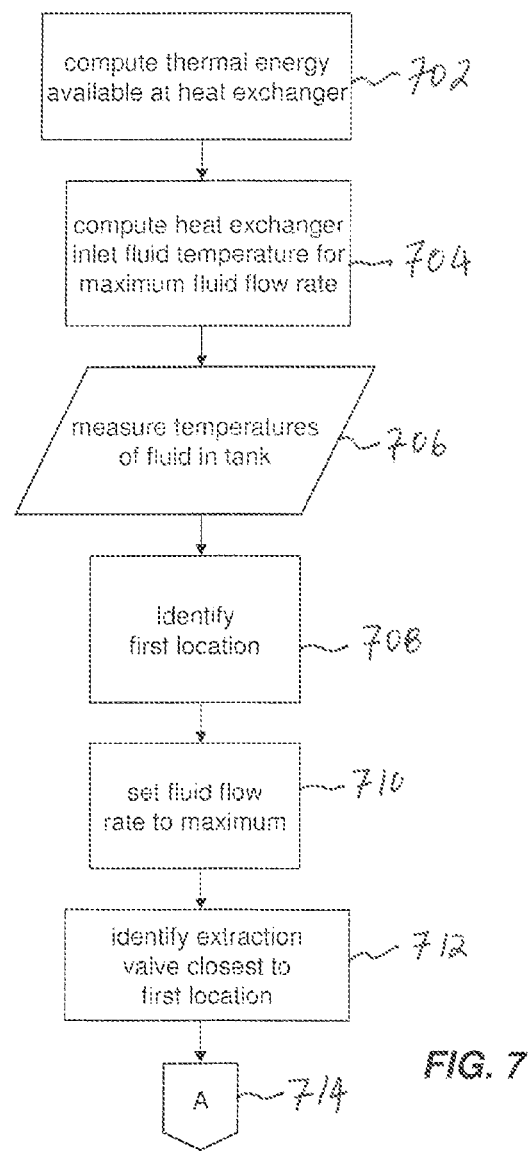
FIG. 7 is a flowchart of a method for identifying an extraction location for the fluid from the tank at the maximum flow rate in accordance with yet another embodiment of the invention.

FIG. 7 is a flowchart for yet another embodiment of a method for identifying an extraction location for fluid 102 within tank 104 at the maximum flow rate for the extracted fluid. Block 702 computes the amount of thermal energy available at heat exchanger 130 for transfer to the fluid flowing through heat exchanger 130. As will be more apparent from the description herein below in reference to FIGS. 8 and 9, the thermal energy available at heat exchanger 130 can be computed and/or measured in alternate embodiments of the invention. Alternatively, any one or more energy source can be configured to provide the thermal energy for transfer to the fluid flowing through heat exchanger 130, and the amount of thermal energy available at heat exchanger 130 can be computed and determined by means well known in the art. The inlet temperature for the fluid entering heat exchanger 130 is computed at block 704 as a function of the amount of thermal energy available at heat exchanger 130 as computed at block 602, the pre-specified maximum flow rate for the fluid flowing through heat exchanger 130, and the exit set point temperature for the fluid exiting heat exchanger 130. In block 706, the plurality of temperature sensors 106 are used for measuring the temperatures of fluid 102 within tank 104 at a plurality of locations along the vertical height of tank 104. In block 708, the first location along the vertical height of tank 104 is identified as the location whereat the temperature of fluid 102 within tank 104 equals the inlet temperature for the fluid entering heat exchanger 130 as computed at block 704. Block 710 sets the flow rate for the fluid flowing through heat exchanger 130 to the pre-specified maximum flow rate. From the plurality of valves 108, block 712 identifies the extraction valve as the valve closest in proximity to the first location as identified in block 708. At connecter 714 the method for optimizing the thermocline in fluid 102 within tank 104 continues as described herein above with reference to FIG. 3.

Figure 8:
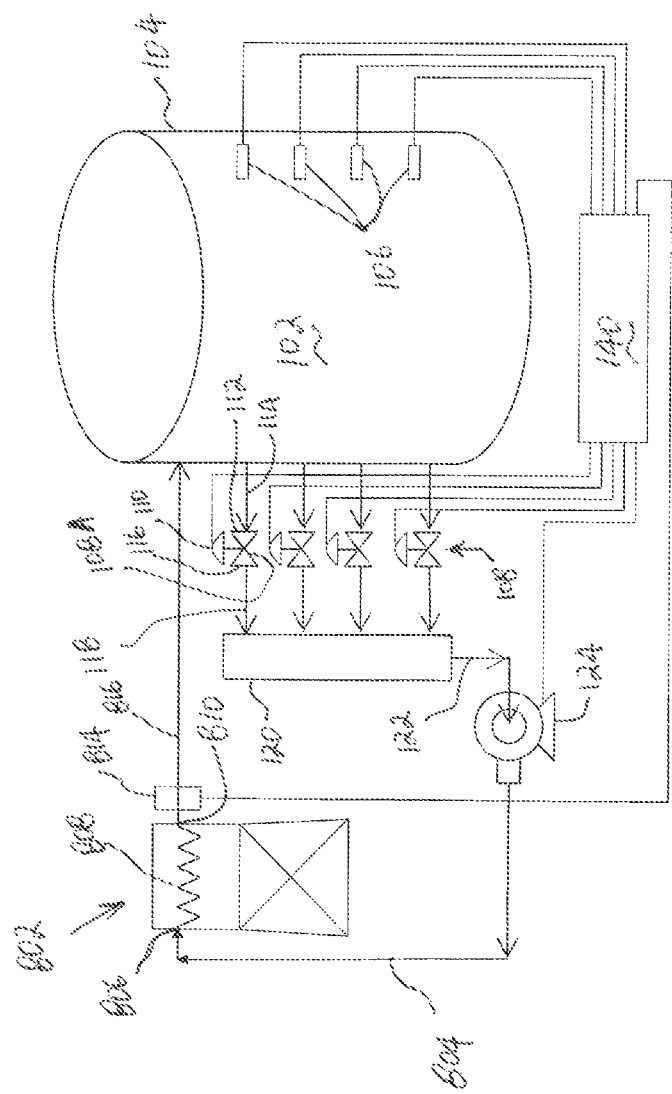
FIG. 8 is an exemplary application of the thermal energy storage system of FIG. 1.

FIG. 8 is an exemplary application of the thermal energy storage system of FIG. 1 wherein like elements are identified by like numerals. As illustrated in FIG. 8, and in accordance with an embodiment of the invention, solar receiver 802 is a heat exchanger wherein thermal energy is transferred to a fluid stream flowing along flow path 804 through solar receiver 802. As illustrated, flow path 804 provides fluidic communication between an outlet of pump 124 and inlet 806 of solar receiver 802. Flow path 808 within solar receiver 802 provides fluidic communication between inlet 806 and outlet 810 of solar receiver 802. Flow path 812 provides fluidic communication between outlet 810 of solar receiver 802 and fluid 102 within tank 104. Sensor 814 measures the temperature of the fluid returned to tank 104 along flow path 816. In an embodiment of the invention, sensor 814 measures the temperature of the fluid at outlet 810 of solar receiver 802.

Figure 9:
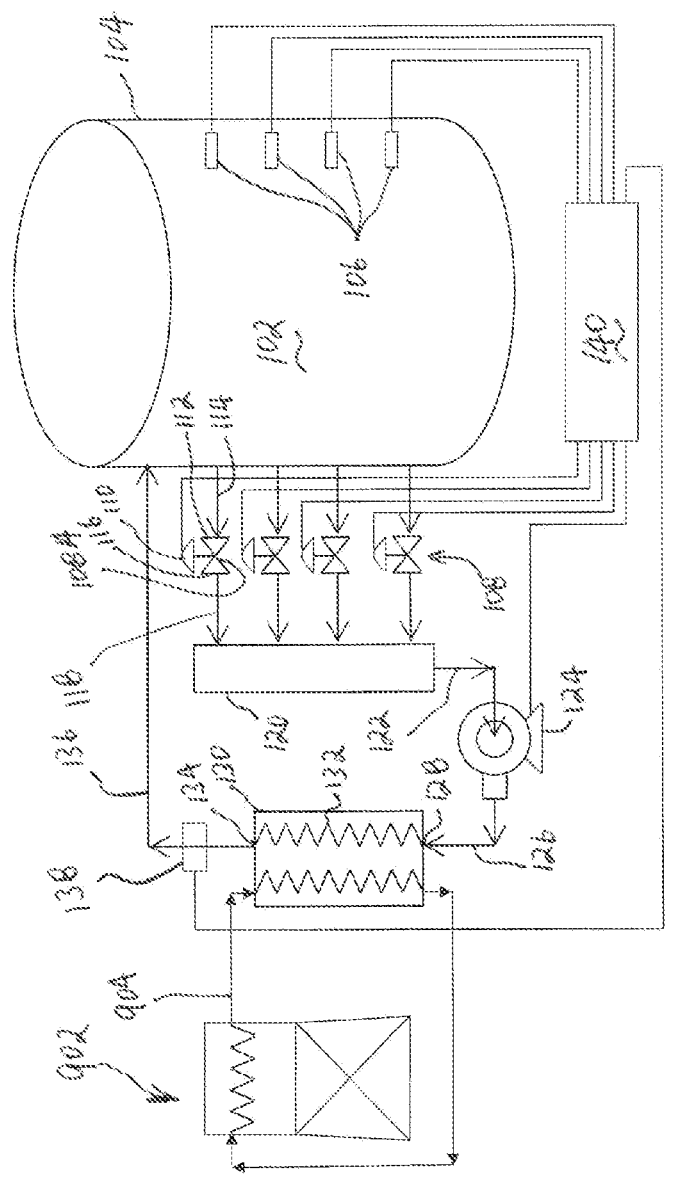
FIG. 9 is another exemplary application of the thermal energy storage system of FIG. 1.

FIG. 9 is another exemplary application of the thermal energy storage system of FIG. 1 wherein like elements are identified by like numerals. As illustrated in FIG. 9, and in accordance with an embodiment of the invention, heat exchanger 130 is in fluidic communication with solar receiver 902. A fluid stream flowing along flow path 904 transports the thermal energy from solar receiver 902 to heat exchanger 130. In heat exchanger 130, thermal energy from the fluid stream flowing along flow path 904 is transferred to the fluid stream flowing along flow path 132.

In embodiments of the invention comprising a solar receiver, such as solar receivers 802 and 902 in FIGS. 8 and 9, respectively, the amount of thermal energy available for transfer to a fluid stream, such as fluid streams flowing along flow paths 808 and 904 in FIGS. 8 and 9, respectively, can be calculated or measured with means well known in the art.

Various modifications and additions may be made to the exemplary embodiments presented hereinabove without departing from the scope and intent of the present invention. For example, while the disclosed embodiments refer to particular features, the scope of the instant invention is considered to also include embodiments having different combinations of features different from and/or in addition to those described herein. Accordingly, the scope of the present invention is intended to embrace all such alternatives, modifications, and variations as falling within the scope and intent of the appended claims, including all equivalents thereof.

We claim:

1. A method for optimizing a thermocline in a fluid within a tank, the method comprising the steps of
   measuring a plurality of temperatures of the fluid at a plurality of locations along a vertical height of the tank;
   identifying a thermocline region from the plurality of temperatures of the fluid;
   computing an average temperature of the fluid in the thermocline region;
   identifying a first location along the vertical height of the tank whereat the temperature of the fluid in the tank equals the average temperature of the fluid in the thermocline region;
   closing a plurality of valves located at a plurality of locations along the vertical height of the tank;
   opening a first valve from the plurality of valves, wherein the first valve is closest in proximity to the first location;
   pumping a fluid stream through a heat exchanger, wherein
     the fluid stream entering the heat exchanger is from the first valve; and
     the fluid stream exiting the heat exchanger is returned to the tank at one or more locations above the thermocline region;
   measuring a temperature of the fluid stream exiting the heat exchanger; and
   maintaining the fluid stream exiting the heat exchanger at an exit set point temperature by modulating a flow rate of the fluid stream.

2. The method of claim 1, wherein the step of modulating the flow rate further comprises the step of modulating the flow rate between a minimum flow rate and a maximum flow rate.

3. The method of claim 2, wherein the step of modulating the flow rate includes the step of maintaining the flow rate at the minimum flow rate when the temperature of the fluid stream exiting the heat exchanger is less than or equal to the exit set point temperature.

4. The method of claim 3, wherein the step of maintaining the fluid stream exiting the heat exchanger at the exit set point temperature further comprises the steps of
   closing the plurality of valves;
   opening a second valve from the plurality of valves, wherein the second valve is above the first valve; and
   pumping the fluid stream from the second valve through the heat exchanger.

5. The method of claim 2, wherein the step of modulating the flow rate includes the step of maintaining the flow rate at the maximum flow rate when the temperature of the fluid stream exiting the heat exchanger is greater than or equal to the exit set point temperature.

6. The method of claim 5, wherein the step of maintaining the fluid stream exiting the heat exchanger at the exit set point temperature further comprises the steps of
   closing the plurality of valves;
   opening a second valve from the plurality of valves, wherein the second valve is below the first valve; and
   pumping the fluid stream from the second valve through the heat exchanger.

7. The method of claim 2, wherein the heat exchanger is a solar receiver.

8. The method of claim 2, wherein the heat exchanger is in fluid communication with a solar receiver.

9. A method for optimizing a thermocline in a fluid within a tank, the method comprising the steps of
   measuring a plurality of temperatures of the fluid at a plurality of locations along a vertical height of the tank;
   identifying a thermocline region from the plurality of temperatures of the fluid;
   identifying a first location below the thermocline region;
   closing a plurality of valves located at a plurality of locations along the vertical height of the tank;
   opening a first valve from the plurality of valves, wherein the first valve is closest in proximity to the first location;
   pumping a fluid stream through a heat exchanger, wherein
      the fluid stream entering the heat exchanger is from the first valve; and
      the fluid stream exiting the heat exchanger is returned to the tank at one or more locations above the thermocline region;
   measuring a temperature of the fluid stream exiting the heat exchanger; and
   maintaining the fluid stream exiting the heat exchanger at an exit set point temperature by modulating a flow rate of the fluid stream.

10. The method of claim 9, wherein the step of modulating the flow rate further comprises the step of modulating the flow rate between a minimum flow rate and a maximum flow rate.

11. The method of claim 10, wherein the step of modulating the flow rate includes the step of maintaining the flow rate at the minimum flow rate when the temperature of the fluid stream exiting the heat exchanger is less than or equal to the exit set point temperature.

12. The method of claim 11, wherein the step of maintaining the fluid stream exiting the heat exchanger at the exit set point temperature further comprises the steps of
   closing the plurality of valves;
   opening a second valve from the plurality of valves, wherein the second valve is above the first valve; and
   pumping the fluid stream from the second valve through the heat exchanger.

13. The method of claim 10, wherein the step of modulating the flow rate includes the step of maintaining the flow rate at the maximum flow rate when the temperature of the fluid stream exiting the heat exchanger is greater than or equal to the exit set point temperature.

14. The method of claim 13, wherein the step of maintaining the fluid stream exiting the heat exchanger at the exit set point temperature further comprises the steps of
   closing the plurality of valves;
   opening a second valve from the plurality of valves, wherein the second valve is below the first valve; and
   pumping the fluid stream from the second valve through the heat exchanger.

15. The method of claim 10, wherein the heat exchanger is a solar receiver.

16. The method of claim 10, wherein the heat exchanger is in fluid communication with a solar receiver.

17. A method for optimizing a thermocline in a fluid within a tank, the method comprising the steps of
   measuring a plurality of temperatures of the fluid at a plurality of locations along a vertical height of the tank;
   identifying a thermocline region from the plurality of temperatures of the fluid;
   computing an average temperature of the fluid in the thermocline region;
   identifying a first location along the vertical height of the tank whereat the temperature of the fluid in the tank equals the average temperature of the fluid in the thermocline region;
   computing an amount of thermal energy available at a heat exchanger for transfer to a fluid stream flowing through the heat exchanger, wherein the fluid stream comprises the fluid from the tank;
   computing a flow rate for the fluid stream flowing through the heat exchanger, wherein
      the temperature of the fluid stream entering the heat exchanger is the temperature of the fluid at the first location; and
      the fluid stream exits the heat exchanger at an exit set point temperature;
   closing a plurality of valves located at a plurality of locations along the vertical height of the tank;
   opening a first valve from the plurality of valves, wherein the first valve is closest in proximity to the first location; and
   pumping the fluid stream at the computed flow rate through the heat exchanger, wherein
      the fluid stream entering the heat exchanger is from the first valve; and
      the fluid stream exiting the heat exchanger is returned to the tank at one or more locations above the thermocline region.

18. The method of claim 17, further comprising the steps of
   modulating the flow rate between a minimum flow rate and a maximum flow rate; and
   measuring a temperature of the fluid stream exiting the heat exchanger.

19. The method of claim 18, wherein the step of modulating the flow rate includes the step of maintaining the flow rate at the minimum flow rate when the temperature of the fluid stream exiting the heat exchanger is less than or equal to the exit set point temperature.

20. The method of claim 19, wherein the step of maintaining the fluid stream exiting the heat exchanger at the exit set point temperature further comprises the steps of
   closing the plurality of valves;
   opening a second valve from the plurality of valves, wherein the second valve is above the first valve; and
   pumping the fluid stream from the second valve through the heat exchanger.

21. The method of claim 18, wherein the step of modulating the flow rate includes the step of maintaining the flow rate at the maximum flow rate when the temperature of the fluid stream exiting the heat exchanger is greater than or equal to the exit set point temperature.

22. The method of claim 21, wherein the step of maintaining the fluid stream exiting the heat exchanger at the exit set point temperature further comprises the steps of
   closing the plurality of valves;
   opening a second valve from the plurality of valves, wherein the second valve is above the first valve; and
   pumping the fluid stream from the second valve through the heat exchanger.

23. The method of claim 18, wherein
   the heat exchanger is a solar receiver; and
   computing the amount of thermal energy available comprises the step of computing an amount of solar energy incident on the solar receiver.

24. The method of claim 18, wherein
   the heat exchanger is a solar receiver; and
   computing the amount of thermal energy available comprises the step of measuring an amount of solar energy incident on the solar receiver.

25. The method of claim 18, wherein
   the heat exchanger is in fluid communication with a solar receiver; and computing the amount of thermal energy available comprises the step of computing an amount of solar energy incident on the solar receiver.

26. The method of claim 18, wherein
the heat exchanger is in fluid communication with a solar receiver; and
computing the amount of thermal energy available comprises the step of measuring an amount of solar energy incident on the solar receiver.

27. A method for optimizing a thermocline in a fluid within a tank, the method comprising the steps of
computing an amount of thermal energy available at a heat exchanger for transfer to a fluid stream flowing through the heat exchanger wherein the fluid stream comprises the fluid from the tank;
computing an inlet temperature for the fluid stream flowing through the heat exchanger at a minimum flow rate and exiting the heat exchanger at an exit set point temperature;
measuring a plurality of temperatures of the fluid at a plurality of locations along a vertical height of the tank;
identifying a first location along the vertical height of the tank whereat the temperature of the fluid in the tank equals the computed inlet temperature for the fluid flowing through the heat exchanger;
closing a plurality of valves located at a plurality of locations along the vertical height of the tank;
opening a first valve from the plurality of valves, wherein the first valve is closest in proximity to the first location; and
pumping the fluid stream at the minimum flow rate through the heat exchanger, wherein
the fluid stream entering the heat exchanger is from the first valve; and
the fluid stream is returned to the tank at one or more locations proximate a top of the tank.

28. The method of claim 27, further comprising the steps of
modulating the flow rate between a minimum flow rate and a maximum flow rate; and
measuring a temperature of the fluid stream exiting the heat exchanger.

29. The method of claim 28, wherein the step of modulating the flow rate includes the step of maintaining the flow rate at the minimum flow rate when the temperature of the fluid stream exiting the heat exchanger is less than or equal to the exit set point temperature.

30. The method of claim 29, wherein the step of maintaining the fluid stream exiting the heat exchanger at the exit set point temperature further comprises the steps of
closing the plurality of valves;
opening a second valve from the plurality of valves, wherein the second valve is above the first valve; and
pumping the fluid stream from the second valve through the heat exchanger.

31. The method of claim 28, wherein the step of modulating the flow rate includes the step of maintaining the flow rate at the maximum flow rate when the temperature of the fluid stream exiting the heat exchanger is greater than or equal to the exit set point temperature.

32. The method of claim 31, wherein the step of maintaining the fluid stream exiting the heat exchanger at the exit set point temperature further comprises the steps of
closing the plurality of valves;
opening a second valve from the plurality of valves, wherein the second valve is below the first valve; and
pumping the fluid stream from the second valve through the heat exchanger.

33. The method of claim 28, wherein
the heat exchanger is a solar receiver; and
computing the amount of thermal energy available comprises the step of computing an amount of solar energy incident on the solar receiver.

34. The method of claim 28, wherein
the heat exchanger is a solar receiver; and
computing the amount of thermal energy available comprises the step of measuring an amount of solar energy incident on the solar receiver.

35. The method of claim 28, wherein
the heat exchanger is in fluid communication with a solar receiver; and
computing the amount of thermal energy available comprises the step of computing an amount of solar energy incident on the solar receiver.

36. The method of claim 28, wherein
the heat exchanger is in fluid communication with a solar receiver; and
computing the amount of thermal energy available comprises the step of measuring an amount of solar energy incident on the solar receiver.

37. A method for optimizing a thermocline in a fluid within a tank, the method comprising the steps of
computing an amount of thermal energy available at a heat exchanger for transfer to a fluid stream flowing through the heat exchanger wherein the fluid stream comprises the fluid from the tank;
computing an inlet temperature for the fluid stream flowing through the heat exchanger at a maximum flow rate and exiting the heat exchanger at an exit set point temperature;
measuring a plurality of temperatures of the fluid at a plurality of locations along a vertical height of the tank;
identifying a first location along the vertical height of the tank whereat the temperature of the fluid in the tank equals the computed inlet temperature for the fluid flowing through the heat exchanger;
closing a plurality of valves located at a plurality of locations along the vertical height of the tank;
opening a first valve from the plurality of valves, wherein the first valve is closest in proximity to the first location; and
pumping the fluid stream at the maximum flow rate through the heat exchanger, wherein
the fluid stream entering the heat exchanger is from the first valve; and
the fluid stream is returned to the tank at one or more locations proximate a top of the tank.

38. The method of claim 37, further comprising the steps of
modulating the flow rate between a minimum flow rate and a maximum flow rate; and
measuring a temperature of the fluid stream exiting the heat exchanger.

39. The method of claim 38, wherein the step of modulating the flow rate includes the step of maintaining the flow rate at the minimum flow rate when the temperature of the fluid stream exiting the heat exchanger is less than or equal to the exit set point temperature.

40. The method of claim 39, wherein the step of maintaining the fluid stream exiting the heat exchanger at the exit set point temperature further comprises the steps of
closing the plurality of valves;
opening a second valve from the plurality of valves, wherein the second valve is above the first valve; and
pumping the fluid stream from the second valve through the heat exchanger.

41. The method of claim 38, wherein the step of modulating the flow rate includes the step of maintaining the flow rate at the maximum flow rate when the temperature of the fluid stream exiting the heat exchanger is greater than or equal to the exit set point temperature.

42. The method of claim 41, wherein the step of maintaining the fluid stream exiting the heat exchanger at the exit set point temperature further comprises the steps of
closing the plurality of valves;
opening a second valve from the plurality of valves, wherein the second valve is below the first valve; and
pumping the fluid stream from the second valve through the heat exchanger.

43. The method of claim 38, wherein
the heat exchanger is a solar receiver; and
computing the amount of thermal energy available comprises the step of computing an amount of solar energy incident on the solar receiver.

44. The method of claim 38, wherein
the heat exchanger is a solar receiver; and
computing the amount of thermal energy available comprises the step of measuring an amount of solar energy incident on the solar receiver.

45. The method of claim 38, wherein
the heat exchanger is in fluid communication with a solar receiver; and
computing the amount of thermal energy available comprises the step of computing an amount of solar energy incident on the solar receiver.

46. The method of claim 38, wherein
the heat exchanger is in fluid communication with a solar receiver; and
computing the amount of thermal energy available comprises the step of measuring an amount of solar energy incident on the solar receiver.

47. A thermal energy storage tank, the tank comprising:
a fluid contained within the tank;
a controller for optimizing a thermocline in the fluid within the tank;
a plurality of temperature sensors at a plurality of locations along a vertical height of the tank, said plurality of temperature sensors measuring a plurality of temperatures of the fluid within the tank and communicating said plurality of temperatures to the controller;
a plurality of valves at a plurality of locations along the vertical height of the tank wherein
each one of the plurality of valves is operationally controlled by the controller;
an inlet of each one of the plurality of valves is in fluid communication with the fluid within the tank; and
an outlet of each one of the plurality of valves is in fluid communication with a header;
a heat exchanger for adding thermal energy to a fluid stream flowing through the heat exchanger, wherein the heat exchanger comprises
at least one inlet through which the fluid stream enters the heat exchanger; and
at least one outlet through which the fluid stream exits the heat exchanger, the at least one outlet in fluid communication with the fluid proximate a top of the tank;
a pump for pumping the fluid stream through the heat exchanger, wherein
the pump is operationally controlled by the controller;
an inlet of the pump is in fluid communication with the header; and
an outlet of the pump is in fluid communication with the at least one inlet of the heat exchanger; and
a sensor for measuring a temperature of the fluid stream exiting the heat exchanger.

48. The thermal energy storage tank of claim 47, wherein the controller
identifies a thermocline region in the fluid within the tank from the plurality of temperatures of the fluid within the tank;
computes an average temperature of the fluid within the thermocline region;
identifies a first location along the vertical height of the tank whereat the temperature of the fluid in the tank proximates the average temperature of the fluid in the thermocline region;
identifies a first valve from the plurality of valves, wherein the first valve is closest in proximity to the first location;
closes the plurality of valves;
opens the first valve;
operates the pump to pump the fluid stream through the heat exchanger; and
maintains the temperature of the fluid stream exiting the heat exchanger at an exit set point temperature by modulating a pump speed to modulate a flow rate of the fluid stream.

49. The thermal energy storage tank of claim 48, wherein the controller modulates the flow rate between a minimum flow rate and a maximum flow rate.

50. The thermal energy storage tank of claim 49, wherein the controller operates the pump to maintain the minimum flow rate.

51. The thermal energy storage tank of claim 50, wherein the controller maintains the temperature of the fluid stream exiting the heat exchanger at the exit set point temperature by
opening a second valve from the plurality of valves, wherein the second valve is above the first valve; and
closing the first valve.

52. The thermal energy storage tank of claim 49, wherein the controller operates the pump to maintain the maximum flow rate.

53. The thermal energy storage tank of claim 52, wherein the controller maintains the fluid stream exiting the heat exchanger at the exit set point temperature by
opening a second valve from the plurality of valves, wherein the second valve is below the first valve; and
closing the first valve.

54. The thermal energy storage tank of claim 47, wherein the heat exchanger is a solar receiver.

55. The thermal energy storage tank of claim 47, wherein the heat exchanger is in fluid communication with a solar receiver.

56. The thermal energy storage tank of claim 47, wherein the fluid within the tank is a phase change thermal storage fluid.

* * * * *